(12) United States Patent
Hori et al.

(10) Patent No.: US 10,866,105 B2
(45) Date of Patent: Dec. 15, 2020

(54) ROUTE GUIDANCE SYSTEM AND RECORDING MEDIUM RECORDING ROUTE GUIDANCE PROGRAM

(71) Applicant: TOYOTA JIDOSHA KABUSHIKI KAISHA, Toyota (JP)

(72) Inventors: Takashige Hori, Aisai (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/166,061

(22) Filed: Oct. 19, 2018

(65) Prior Publication Data
US 2019/0128682 A1  May 2, 2019

(30) Foreign Application Priority Data
Nov. 2, 2017  (JP) .................. 2017-212614

(51) Int. Cl.
| | | |
|---|---|---|
| G01C 21/34 | (2006.01) | |
| G08G 1/123 | (2006.01) | |
| G06G 7/70 | (2006.01) | |
| G06G 7/76 | (2006.01) | |
| G08G 1/00 | (2006.01) | |

(52) U.S. Cl.
CPC ..... *G01C 21/3423* (2013.01); *G01C 21/3446* (2013.01)

(58) Field of Classification Search
CPC  G01C 21/3423; G01C 21/3446; G01C 21/34; G06F 17/30; G06F 17/00; G08G 1/00
USPC ..................... 701/533, 117; 705/6
See application file for complete search history.

(56) References Cited

U.S. PATENT DOCUMENTS

2010/0305984 A1* 12/2010 Ben-Yitschak ........ G06Q 10/02
705/6
2013/0046456 A1*  2/2013 Scofield ............. G01C 21/3423
701/117

FOREIGN PATENT DOCUMENTS

| JP | 2008-275491 A | 11/2008 |
| JP | 2011-145993 A |  7/2011 |
| JP | 2012-202920 A | 10/2012 |
| JP |    5495391 B2 |  5/2014 |
| JP | 2016075499 A * |  5/2016 |

OTHER PUBLICATIONS

English Translation for JP2016075499A.*

* cited by examiner

*Primary Examiner* — Mahmoud S Ismail
(74) *Attorney, Agent, or Firm* — Hunton Andrews Kurth LLP/HAK

(57) ABSTRACT

A route guidance system according to an aspect of the present invention includes: a route search part that searches for one or more routes for each of a way from a point of departure to a destination and a way back from the destination to the point of departure, using more than one type of transportation means; and a route guidance part that presents, when searched routes include a multi-railway-line station and parking lots, a route including a use of different railway lines, from among the plurality of railway lines having access to the multi-railway-line station, on the way to the destination and on the way back from the destination, the route including a parking lot, which allows a total travel time, being a sum of a travel time to the destination and a travel time back from the destination, to be the shortest.

4 Claims, 2 Drawing Sheets

ROUTE GUIDANCE SYSTEM AND RECORDING MEDIUM RECORDING ROUTE GUIDANCE PROGRAM

CROSS-REFERENCES TO RELATED APPLICATIONS

This application relates to and claims priority from Japanese Patent Application No. 2017-212614, filed on Nov. 2, 2017, the entire disclosure of which is incorporated herein by reference.

BACKGROUND

Field

The present invention relates to a route guidance system and a recording medium recording a route guidance program.

Description of Related Art

JP2012-202920 A discloses a parking lot guidance system having a multimodal route search function. In JP2012-202920 A, when providing a route including a combination of (i) an automobile travelling zone in which a user travels by an automobile, and (ii) a non-automobile travelling zone in which the user travels by transportation means different from the automobile (such as a train), the system provides guidance to a parking lot located near a station connecting the automobile-travelling zone and the non-automobile travelling zone.

In a station which is accessed by several railway lines, a ticket gate is usually provided for each railway line. Thus, if a station connecting an automobile-travelling zone and a non-automobile traveling zone is a station which is accessed by several railway lines and a user uses different railway lines on the way to and from a destination, the distance from a parking lot to a ticket gate on the way to the destination may be different from the distance from a ticket gate to the parking lot on the way back from the destination. Since the system disclosed in JP2012-202920 A provides guidance to a parking lot used when the user changes his/her transportation means from the automobile to a train or the like, the use of the parking lot indicated by the system may unnecessarily increase the total travel time required for travelling to and from the destination, which may decrease the user friendliness of such system.

SUMMARY

In view of the above circumstances, an object of the present invention is to provide a route guidance system and a recording medium recording a route guidance program capable of increasing user friendliness.

A route guidance system according to an aspect of the present invention includes: a route search part that searches for one or more routes for each of a way from a point of departure to a destination and a way back from the destination to the point of departure, using more than one type of transportation means; and a route guidance part that presents: when searched routes include a station accessed by a plurality of railway lines and parking lots, a route including a use of different railway lines, from among the plurality of railway lines having access to the station, on the way to the destination and on the way back from the destination, the route including a parking lot which allows a total travel time, being a sum of a travel time to the destination and a travel time back from the destination, to be the shortest.

In the above aspect, the station may be a station where a user takes a train after parking an automobile at the parking lot on the way to the destination and a station where the user gets off a train before moving to the parking lot on the way back from the destination.

In the above aspect, the route search part may receive designation of the different railway lines as search conditions.

A recording medium recording a route guidance program according to another aspect of the present invention is a non-transitory computer-readable medium recording a route guidance program which causes a computer to function as: a route search part that searches for one or more routes for each of a way from a point of departure to a destination and a way back from the destination to the point of departure, using more than one type of transportation means; and a route guidance part that presents: when searched routes include a station accessed by a plurality of railway lines and parking lots, a route including a use of different railway lines, from among the plurality of railway lines having access to the station, on the way to the destination and on the way back from the destination, the route including a parking lot which allows a total travel time, being a sum of a travel time to the destination and a travel time back from the destination, to be the shortest.

According to the present invention, it is possible to provide a route guidance system and a recording medium recording a route guidance program which are capable of increasing user friendliness.

DETAILED DESCRIPTION

Figure 1:
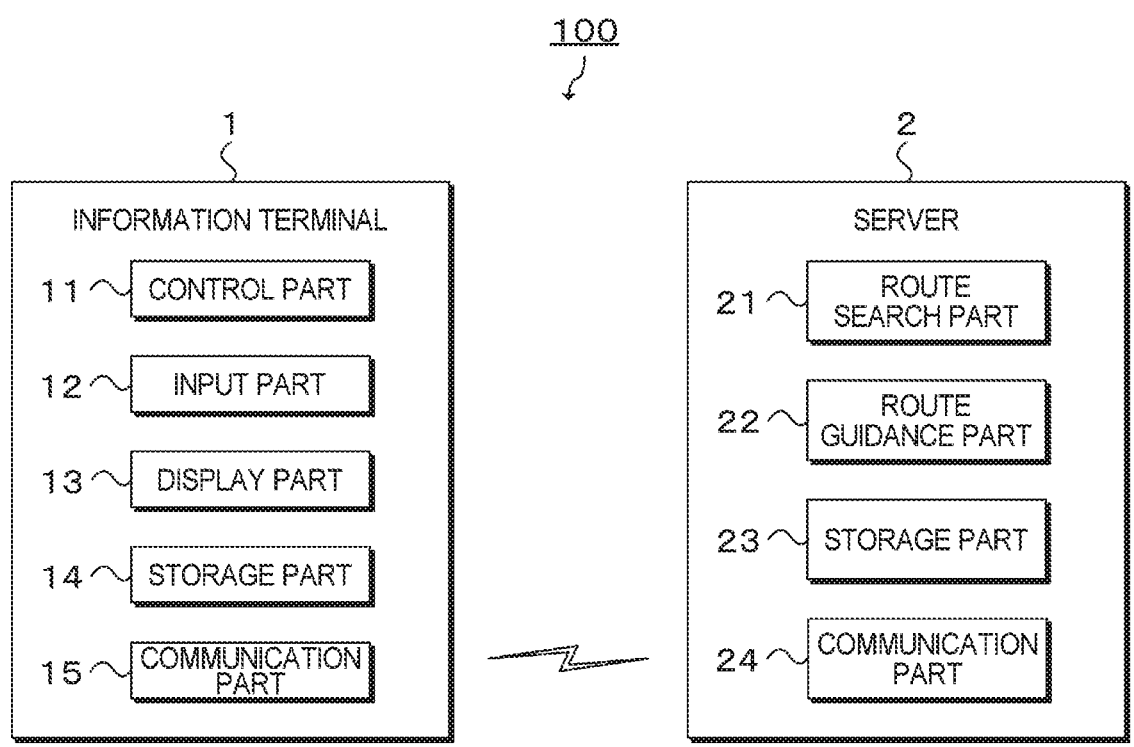
FIG. 1 is a diagram illustrating a configuration of a route guidance system according to an embodiment.

A preferred embodiment of the present invention will now be described below with reference to the attached drawings. In the drawings, like reference numerals denote common or similar components.

The following description will describe a configuration of a route guidance system according to the present embodiment with reference to FIG. 1. A route guidance system 100 may include, for example, an information terminal 1 used by a user and a server 2 arranged in a data center or the like. The information terminal 1 and the server 2 are configured so as to communicate with each other via, for example, a wireless network.

The information terminal 1 shown in FIG. 1 is a portable tablet-type terminal device, including a mobile phone such as a smartphone. The information terminal 1 may have functional configurations such as a control part 11, an input part 12, a display part 13, a storage part 14 and a communication part 15. The information terminal 1 may include physical configurations such as a control unit including a CPU (Central Processing Unit) and a memory, an operation part, a display, a storage unit and a communication unit. When the CPU executes a predetermined program stored in the memory, a function of each of the control part 11, the input part 12, the display part 13, the storage part 14 and the communication part 15 is fulfilled.

The server 2 may have functional configurations such as a route search part 21, a route guidance part 22, a storage part 23 and a communication part 24. The server 2 may include physical configurations such as a control unit including a CPU and a memory, a storage unit and a communication unit. When the CPU executes a predetermined program stored in the memory, a function of each of the route search part 21, the route guidance part 22, the storage part 23 and the communication part 24 is fulfilled. The route search part 21 and the route guidance part 22 from among the above-mentioned functions will be described in more detail below.

The route search part 21 searches for one or more routes for each of a way from a point of departure to a destination and a way back from the destination to the point of departure, using more than one type of transportation means. In other words, the route search part 21 has a multimodal route search function to search for one or more routes for each of the way from the point of departure to the destination and the way back from the destination to the point of departure. The point of departure and the destination are designated by the information terminal 1 as search conditions for the routes.

Examples of the types of transportation means may include automobiles, trains, buses, ships, aircrafts, bicycles and walking. In the present embodiment, a situation in which a route search is made with an automobile and a train employed as the transportation means will be described below for the sake of explanation.

The route guidance part 22 presents the information terminal 1 with a route to the destination and a route back from the destination which have been searched by the route search part 21. A more detailed description will be provided in the following.

When a station accessed by a plurality of railway lines (hereinafter referred to as "multi-railway-line station" in some contexts) and parking lots are included in the route to the destination and the route back from the destination which have been searched by the route search part 21, the route guidance part 22 presents a route which includes the use of different railway lines, from among the plurality of railway lines having access to the multi-railway-line station, on the way to a destination and on the way back from the destination, the route including a parking lot which allows the total travel time, being the sum of a travel time to the destination and a travel time back from the destination, to be the shortest. A more detailed description will be provided in the following, with reference to FIG. 2.

Figure 2:
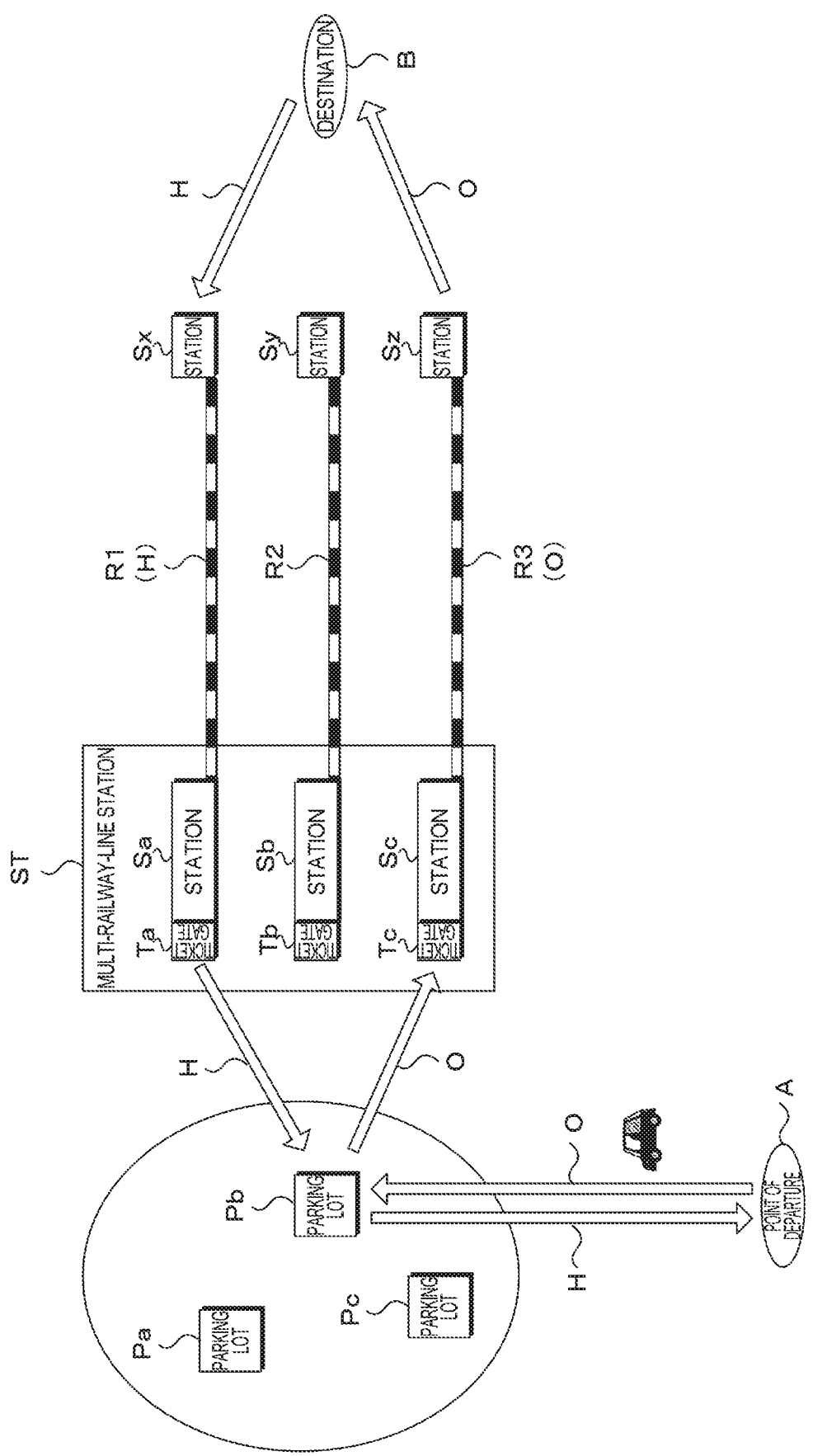
FIG. 2 is a schematic diagram illustrating a search result from a point of departure to a destination.

FIG. 2 is a schematic diagram illustrating a search result from a point of departure (e.g., a home) A to a destination (e.g., an office) B. FIG. 2 shows candidate routes from the point of departure A to the destination B which include: a multi-railway-line station ST including three stations Sa, Sb Sc of three railway lines R1, R2 and R3; and three parking lots Pa, Pb and Pc located near the multi-railway-line station ST. The multi-railway-line station ST is a station where a user takes a train after the user parks his/her automobile at a parking lot on the way to the destination and a station where the user gets off a train before moving to the parking lot on the way back from the destination.

There are three parking lots Pa, Pb and Pc near the multi-railway-line station ST. Thus, there are three candidate routes between the point of departure A and the parking lots Pa, Pb and Pc.

Three railway lines R1, R2 and R3 have access to the multi-railway-line station ST. Thus, there are three candidate routes using the three railway lines R1, R2 and R3 between each of the three parking lots Pa, Pb and Pc and the destination B. For example, there are the following three candidate routes between the parking lot Pa and the destination B: (1) a route from the parking lot Pa, via a station Sa having a ticket gate Ta in the multi-railway-line station ST and a station Sx, to the destination B; (2) a route from the parking lot Pa, via a station Sb having a ticket gate Tb in the multi-railway-line station ST and a station Sy, to the destination B; and (3) a route from the parking lot Pa, via a station Sc having a ticket gate Tc in the multi-railway-line station ST and a station Sz, to the destination B.

The route guidance part 22 selects a parking lot which allows the total travel time, being the sum of a travel time to the destination and a travel time back from the destination, to be the shortest, based on the above-mentioned candidate routes. The route guidance part 22 then presents the information terminal 1 with a route to the destination and a route back from the destination including the selected parking lot.

In this example, the route guidance part 22 selects the parking lot Pb from among the parking lots Pa, Pb and Pc near the multi-railway-line station ST, as a parking lot which allows the total travel time, being the sum of the travel time to the destination and the travel time back from the destination, to be the shortest. Further, the route guidance part 22 presents: as a route O to the destination, a route from the point of departure A, via the parking lot Pb, the station Sc having the ticket gate Tc in the multi-railway-line station ST, and the station Sz, to the destination B; and as a route H back from the destination, a route from the destination B, via the station Sx, the station Sa having the ticket gate Ta in the multi-railway-line station ST, and the parking lot Pb, to the point of departure A.

The route guidance part 22 may propose walking or using a bicycle as transportation means for travelling from the parking lot Pb to the station Sc and from the station Sz to the destination B in the route O to the destination. Similarly, the route guidance part 22 may propose walking or using a bicycle as transportation means for travelling from the destination B to the station Sx and from the station Sa to the parking lot Pb in the route H back from the destination B.

The parking lot and the routes to/from the destination which are presented to the information terminal 1 do not have to be limited to the parking lot and the route to/from the destination which allow for the shortest total travel time. For example, a plurality of parking lots, a plurality of routes to the destination and a plurality of routes back from the destination may be presented in ascending order of travel time.

When designating route search conditions, the user may be allowed to designate a station and a ticket gate in a multi-railway-line station ST for each of the route to the destination and the route from the destination.

As described above, according to the route guidance system 100 of the present embodiment, when one or more routes are searched for each of a way from a point of departure to a destination and a way back from the destination to the point of departure, using more than one type of transportation means, and a multi-railway-line station and parking lots are included in the searched routes, it is possible to present a route which includes the use of different railway lines, from among the railway lines having access to the multi-railway-line station, on the way to and back from the destination, the route including a parking lot which allows the total travel time, being the sum of a travel time to the destination and a travel time back from the destination, to be the shortest.

That is to say, even in a situation where a route for travelling using an automobile and a train is searched for and different railway lines are used on the way to and back from the destination, it is possible to provide guidance to a parking lot which allows the total travel time to and from the destination to be the shortest.

Therefore, the route guidance system 100 according to the present embodiment can improve user friendliness in the multimodal route search.

Modifications

The present invention is not limited to the above-mentioned embodiment and may be implemented in various ways without departing from the gist of the invention. Accordingly, the above-mentioned embodiment is merely an example in every respect and should therefore not be interpreted in a limited way. For example, the order of the above-mentioned operation steps may be rearranged as appropriate, or some operations may be performed in parallel, without causing any inconsistency with respect to the content of processing.

Although the server 2 includes the route search part 21 and the route guidance part 22 in the above embodiment, the configuration is not limited thereto and the information terminal 1 may include part or all of the functions of the route search part 21 and the route guidance part 22.

The components of the information terminal 1 and of the server 2 are not limited to the components described in the above embodiment and an arbitrary component may be added as appropriate.

What is claimed is:

1. A route guidance system, comprising
a central processing unit (CPU); and
a memory coupled to the CPU, wherein the CPU executes a predetermined program stored in the memory to perform searching for one or more routes for each of a way from a point of departure to a destination and a way back from the destination to the point of departure, using more than one type of transportation means;
presenting: when searched routes include a station accessed by a plurality of railway lines and parking lots, a route including a use of different railway lines, from among the plurality of railway lines having access to the station, on the way to the destination and on the way back from the destination, the route including a parking lot which allows a total travel time, being a sum of a travel time to the destination and a travel time back from the destination, to be the shortest, and the parking lot is on the way to the destination and on the way back from the destination; and
presenting a plurality of parking lots from among the parking lots, a plurality routes to the destination from among the searched routes and a plurality of routes back from the destination from among the searched routes in an ascending order of travel time, wherein
each of the searched routes is determined by designating the station and a ticket gate of the station as searching conditions.

2. The route guidance system according to claim 1, wherein the station is a station where a user takes a train after parking an automobile at the parking lot on the way to the destination and a station where the user gets off a train before moving to the parking lot on the way back from the destination.

3. The route guidance system according to claim 1, wherein the CPU executes a predetermined program stored in the memory to further perform receiving designation of the different railway lines as search conditions.

4. A non-transitory computer-readable medium recording a route guidance program which causes a computer to:
search for one or more routes for each of a way from a point of departure to a destination and a way back from the destination to the point of departure, using more than one type of transportation means;
present: when searched routes include a station accessed by a plurality of railway lines and parking lots, a route including a use of different railway lines, from among the plurality of railway lines having access to the station, on the way to the destination and on the way back from the destination, the route including a parking lot which allows a total travel time, being a sum of a travel time to the destination and a travel time back from the destination, to be the shortest, and the parking lot is on the way to the destination and on the way back from the destination; and
present a plurality of parking lots from among the parking lots, a plurality routes to the destination from among the searched routes and a plurality of routes back from the destination from among the searched routes in an ascending order of travel time, wherein
each of the searched routes is determined by designating the station and a ticket gate of the station as searching conditions.

* * * * *